FIG. 1

INVENTORS
IRA B. MADISON
MARVIN STERNBERG
BY EDWARD A. NEU, JR.

AGENT

Nov. 9, 1965  I. B. MADISON ETAL  3,216,191
THRUST CHAMBER AND TURBOPUMP ASSEMBLY
Filed May 9, 1960  4 Sheets-Sheet 2

FIG. 2

*INVENTORS*
IRA B. MADISON
MARVIN STERNBERG
BY EDWARD A. NEU, JR.

AGENT

Nov. 9, 1965    I. B. MADISON ETAL    3,216,191
THRUST CHAMBER AND TURBOPUMP ASSEMBLY
Filed May 9, 1960    4 Sheets-Sheet 3

INVENTORS
IRA B. MADISON
MARVIN STERNBERG
BY EDWARD A. NEU, JR.

AGENT

Nov. 9, 1965

I. B. MADISON ETAL 3,216,191

THRUST CHAMBER AND TURBOPUMP ASSEMBLY

Filed May 9, 1960

*INVENTORS*
IRA B. MADISON
MARVIN STERNBERG
BY EDWARD A. NEU, Jr.

AGENT

United States Patent Office 3,216,191
Patented Nov. 9, 1965

3,216,191
THRUST CHAMBER AND TURBOPUMP ASSEMBLY
Ira B. Madison, Pacoima, Marvin Sternberg, Granada Hills, and Edward A. Neu, Jr., Tarzana, Calif., assignors to North American Aviation, Inc.
Filed May 9, 1960, Ser. No. 27,705
17 Claims. (Cl. 60—35.6)

This invention relates to thrust chambers and to their assembly in rocket engines and more specifically to rocket engine thrust chambers including structural features for minimizing chamber length while maintaining high operational efficiency, and to minimum length assemblies of such thrust chambers with propellent pumps.

Rocket engine thrust chambers of the prior art have generally been constructed to include a cylindrical combustion chamber, a constricted throat being provided at an open end of the combustion chamber, and a divergent nozzle attached to and depending from the throat structure in either a conical or a bell-shaped section. These components are disposed in axial alignment and therefore require a relatively great length to accomplish their design function. This length cannot be materially reduced in thrust chambers of this basic design since only approximately 20 to 30 percent of the total achievable thrust is produced upon the diverging nozzle walls, the balance being produced over the combustion chamber area. The length of such chambers is further extended by the necessity, in most instances, of mounting the propellent pumps in axial alignment with the thrust chamber adjacent the combustion chamber closed end. Therefore, the thrust-to-length ratio of engines incorporating these thrust chambers is, by necessity, relatively high. Such high ratios invariably require structural support and related hardware of a proportionate weight. These characteristics are detrimental to ultimate vehicle requirements, particularly when the rocket engine is applied to a missile and depends upon self-contained propellents for its production of usable thrust. Structural weight is an extremely critcial factor in such cases since an excess thereof has a direct and adverse effect upon missile range and payload.

More recently developed thrust chambers, e.g., the type commonly referred to as the spike nozzle which includes an annular combustion chamber and nozzle walls curving symmetrically from the combustion chamber to converge at a remote point upon the thrust chamber axis, have succeeded in reducing the thrust chamber length through basic changes in thrust chambers. Nevertheless, it has usually been necessary that the turbopump utilized for supplying propellents under pressure to the combustion chamber be mounted externally of the thrust chamber. Since a thrust chamber of approximately 150,000 pounds thrust requires a turbopump occupying a space of approximately three to four feet in length in addition to a thrust chamber length of six to eight feet, it becomes apparent that reduction of the total rocket engine length by the length required for placement of the turbopump would be a goal desirable of achievement in the rocket engine field.

It is therefore an object of the present invention to provide a thrust chamber of minimum structural length.

Another object of this invention is to provide a thrust chamber including provisions for mounting propellent pumps within the forward to rearward confines of the thrust chamber.

Still another object is to provide an integrated thrust chamber and turbopump assembly.

A further object is to provide an improved expansion-deflection thrust chamber and turbopump assembly having a minimum length and a high thrust coefficient regardless of the altitudes through which it operates.

A still further object is to provide a thrust chamber including a centrally expanded annular combustion chamber and wherein propellent injection is made at approximately 180 degrees removed from the ultimate combustion gas flow.

Yet another object of invention is to provide a thrust chamber including an annular combustion chamber radially removed from the chamber axis and adapted for the acceptance of a turbopump within the resulting cavity.

Other objects of invention will become apparent from the following description taken in connection with the accompanying drawings, in which.

The thrust chamber of this invention includes an annular combustion chamber structure, the internal wall of which is radially removed from a central axis in order that at least a portion of a turbopump is positioned approximately centrally thereof, an outer wall concentric with and surrounding the inner wall in a spaced relationship, and wherein an expansion nozzle having a generally divergent section is positioned in a radially outward and spaced relationship from the combustion chamber and adjacently extending over the outer wall of the combustion chamber so as to define an annular constricted throat with a free end of that outer wall. In one embodiment, the entire engine assembly is constructed to utilize a minimum structural length, the turbopump assembly, the combustion chamber, and the exhaust nozzle each utilizing approximately the same axial distance.

Because of the turbopump placement within the confines of the thrust chamber proper in one embodiment of the invention, the turbopump is sometimes referred to as being "buried" within the thrust chamber. Because of the extremely flat appearance which this thrust chamber and turbopump assembly present, the assembly may also be referred to as a "pancake" rocket engine.

The thrust chamber of the present invention is of a class sometimes referred to as expansion-deflection type thrust chambers, wherein gases generated through the combustion of propellent in the combustion chamber are expanded essentially radially outward through a constricted annular throat, further expanded within the nozzle and deflected into a more nearly axial direction by the nozzle walls. A high pressure loading is thereby maintained over the effective length of the nozzle. This pressure loading characteristic imparts to the thrust chamber a greatly enhanced ability to efficiently capture and utilize a maximum of the total thrust available in the expansion of the combustion gases, the entire thrust being produced upon the nozzle walls proper. More complete discussions of the principles involved in thrust chambers of this type will be found in co-pending patent applications entitled "An Expansion Deflection Thrust Chamber," Serial No. 27,128 filed May 5, 1960, now abandoned and "A Reverse Flow Thrust Chamber," Serial No. 27,126 filed May 5, 1960.

Through the utilization of the present invention, the thrust chamber and turbopump assembly is reduced in length to approximately one-third that of a conventional thrust chamber and turbopump assembly. Although this invention is usable on other types of vehicles, when it is used on a missile the total length and weight of the missile are reduced materially, with a direct resultant increase in missile range and/or payload. Alternatively, the excess space provided by the rocket engine length reduction may be utilized for the storage of extra propellent for again achieving greater range, or increasing payload.

Figure 1:
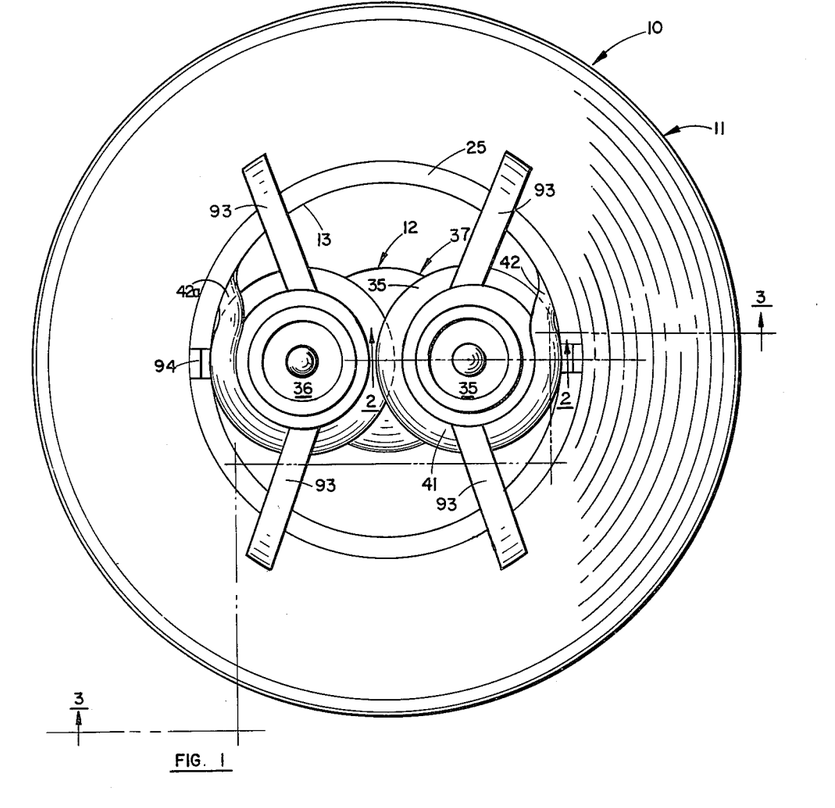
FIG. 1 is a plan view of a basic thrust chamber-turbopump assembly of this invention.

Two typical embodiments of the present invention are illustrated in the drawings. In detail, FIG. 1 shows a plan view of a first embodiment to illustrate the annular or toroidal pattern usually formed by thrust chambers of this invention and a representative manner in which a turbopump is positioned within the annular chamber. The thrust chamber of the overall rocket engine 10 is generally indicated as 11, and the turbopump assembly is generally indicated as 12. These and other portions of the assembly are more specifically illustrated in FIGS. 2, 3, and 4.

Thrust chamber 11 includes an inner wall 13 (see FIG. 3), which is usually, but not necessarily, cylindrical and an outer wall 14 radially and concentrically displaced from inner wall 13. A curved annular tip or shoulder 15 is attached to and usually integral with one extremity of outer wall 14. The inner and outer walls are connected at what is termed as their rearward extremities by a representatively illustrated injector 16 and a propellent manifold 17. Injector 16 includes a passage 18 for propellent transmittal and a series of injector orifices 19 interconnected with passage 18. A series of injector orifices 20 through injector 16 communicate between the interior of propellent manifold 17 and combustion chamber 31. A nozzle wall 21 extends essentially radially outward from inner wall 13 in an adjacent spaced relationship to annular tip 15 and curves into a generally conical or bell-shaped extension or skirt portion 23 as it progresses toward the rearward direction. Nozzle wall 21 begins at about the point indicated as 22 and is usually integral with inner wall 13. Nozzle skirt 23 sometimes includes hoop-like hat band stiffening members 24 to assist the nozzle wall in resisting buckling and/or tensile forces.

Figure 3:
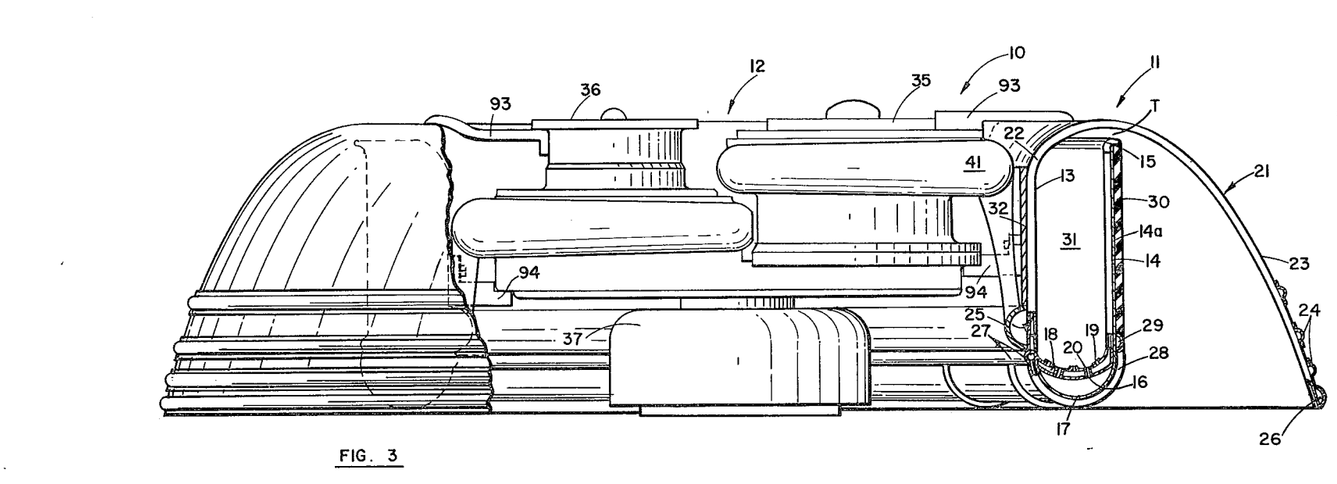
FIG. 3 is a cutaway elevational view in partial section, the section being taken along line 3—3 of FIG. 1.
Figure 4:
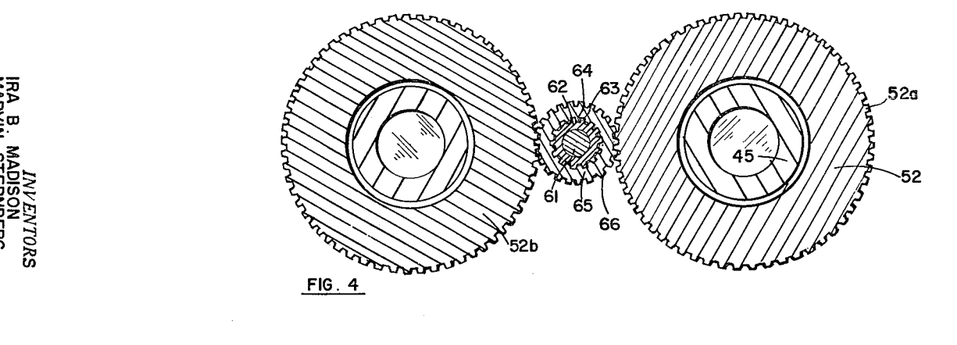
FIG. 4 is a section of the turbopump gear train only as taken along line 4—4 of FIG. 2.
Figure 5:
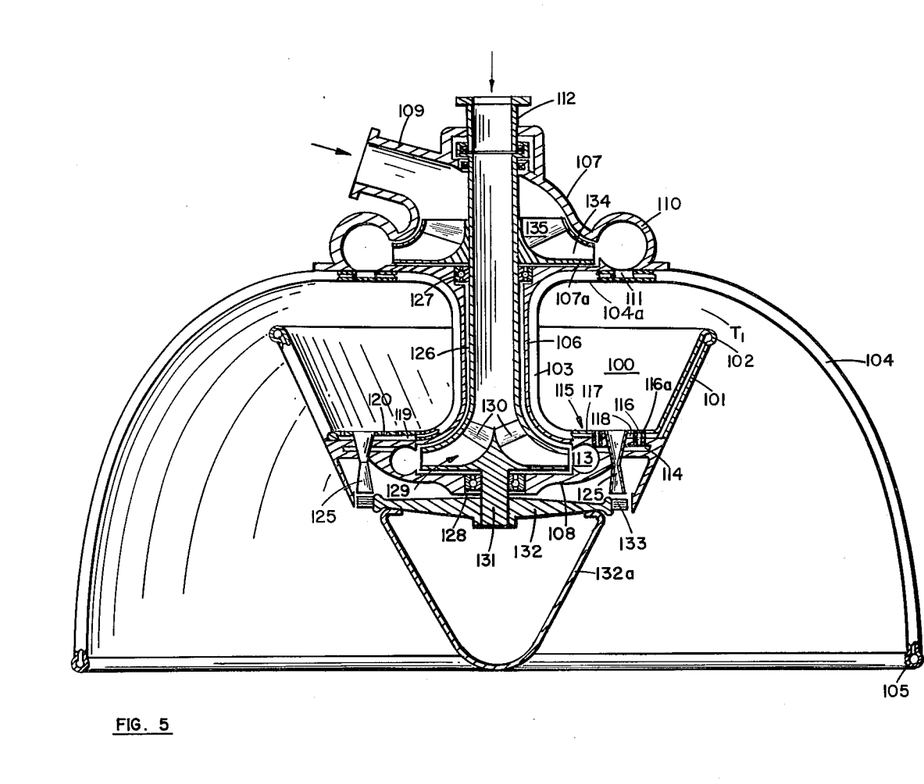
FIG. 5 is a sectional elevation of a simplified embodiment of this invention wherein the thrust chamber structure and the turbopump housing are integrated.

Inner and outer walls 13 and 14, respectively, and nozzle wall 21 may be constructed in accordance with presently known techniques utilizing such materials as stainless steel, for example, coated with a high temperature resistant material such as aluminum oxide or zirconium oxide. They may also be constructed of certain commercially known high temperature resistant phenolic laminates, of double walls of metal for the passage therebetween of coolant fluid, of a series of tubular members abutted and adhesively joined to prevent passage of gases therethrough, or by any other technique. However, it has been found that the mentioned tubular construction presently well known in the thrust chamber construction art is a highly effective manner of constructing the thrust chamber for maintaining the nozzle and combustion chamber walls at non-critical temperatures. Therefore, tubular construction is preferred in the practice of the present invention. Such construction is also illustrated in FIGS. 3 and 5.

In order to facilitate cooling by tubular construction, a manifold 25 is attached internally of inner wall 13 and the manifold interior is usually interconnected with the interior of every second abutting tubular member forming a part of inner wall 13 and nozzle wall 21. Another manifold 26 is attached to the rearward extremity of nozzle skirt 23, its interior being commonly connected to the interior of each tube forming a portion of skirt 23. Still another manifold 27 is interconnected to the rearward extremity of every second tube forming a portion of inner wall 13, the last mentioned tubes being those alternative to the tubes interconnected with manifold 25. Manifold 27 is also interconnected to a series of cross-over tubes 28 which are connected in turn to yet another manifold 29 disposed above the exterior of outer wall 14. Manifold 29 is usually interconnected with the interior of every second tubular member making up a portion of outer wall 14 and the alternative tubular members are interconnected with interior passage 18 of injector 16. In this instance, hollow tip 15 also acts as a manifold and is interconnected with each tubular member making up a portion of outer wall 14. The specific alternating tube interconnections used are design considerations changeable without departing from the scope of invention.

A structural tensile member or wrapping 14a may be adapted about the external periphery of wall 14 to provide tensile support for that wall. Any structural material capable of high tensile strengths is usable in this location.

Even though the described series of passages for wall cooling purposes is provided, it is sometimes desirable to provide a further heat sink for outer wall 14 and for the protection of tensile member 14a. At such times, an insulation material 30 may be annularly disposed about the exterior of outer wall 14 between tip 15 and manifold 29. Insulation 30 may typically be comprised of a rubber composition containing from about 50 to about 350 parts of asbestos fiber per 100 parts of rubber. An example is a copolymer of butadiene and vinylpyridine rubber containing from about 5 to about 50 weight percent of vinylpyridine components. A specific example is a rubber composed of a copolymer of butadiene and 2-methyl-5-vinylpyridine in the weight ratio of 90 parts butadiene to 10 parts 2-methyl-5-vinylpyridine.

Insulation 30 may alternatively be applied internally rather than externally of combustion chamber 31 which is defined between walls 13 and 14 and between injector 16 and the portion of nozzle wall 21 covering a major portion of the otherwise open end of the combustion chamber between the forward extremity of walls 13 and 14.

The constricted annular throat T is defined between the extremity of tip member 15 and the portion of nozzle wall 21 most adjacent thereto. Combustion gases exiting from combustion chamber 31 into the interior of nozzle 11 intermediate of wall 14 and nozzle wall 21 must pass through throat T in a generally radial direction with respect to the thrust chamber and combustion chamber axis.

Dependent upon the structural integrity of wall 13 and the loads applied to it, it is sometimes desirable to provide structural support to resist buckling tendencies. A compressive structure 32 is provided for this purpose and illustrated herein as a honeycombed material positioned in contact with wall 13. Other structural configurations capable of resisting compressive loads may obviously be substituted for the honeycomb material.

Turbopump assemblies usable with this invention are usually comprised of a fuel pump, an oxidizer pump, and a turbine mechanically connected to the pumps for rotatably driving them. The turbine is driven in the usual case by high pressure gases evolved in a gas generator device utilizing either liquid or solid propellant. This gas generator may be independent or integrated within the turbine housing. Alternatively, the turbine drive gases may be supplied from an independent high pressured source such as a pressurized gas, or after starting combustion gases may be bled by appropriate conduit means directly from the interior of combustion chamber 31.

While the specific arrangement of the components making up the turbopump assembly may be positioned in a manner such that the pump axes are parallel to the axis of the thrust chamber or normal thereto dependent upon design considerations for the particular application, one embodiment wherein the pump axes are parallel to the thrust chamber axis and wherein the turbine is driven by a gas generator constitutes a preferred embodiment to illustrate system operability.

Referring back to FIG. 1, turbopump assembly 12 includes a fuel pump 35, an oxidizer pump 36, and a housing 37 wherein the turbine and the gas generator are contained.

The fuel and oxidizer pumps are constructed in the same basic manner, the differences therein being only minor to meet the structural design conditions inherent in positioning the pumps within the space requirements internally of the thrust chamber. Therefore, only pump 35 is illustrated in section as being representative of both. The turbine and gas generator are also shown in partial section in sufficient detail to illustrate their operating principles.

Figure 2:
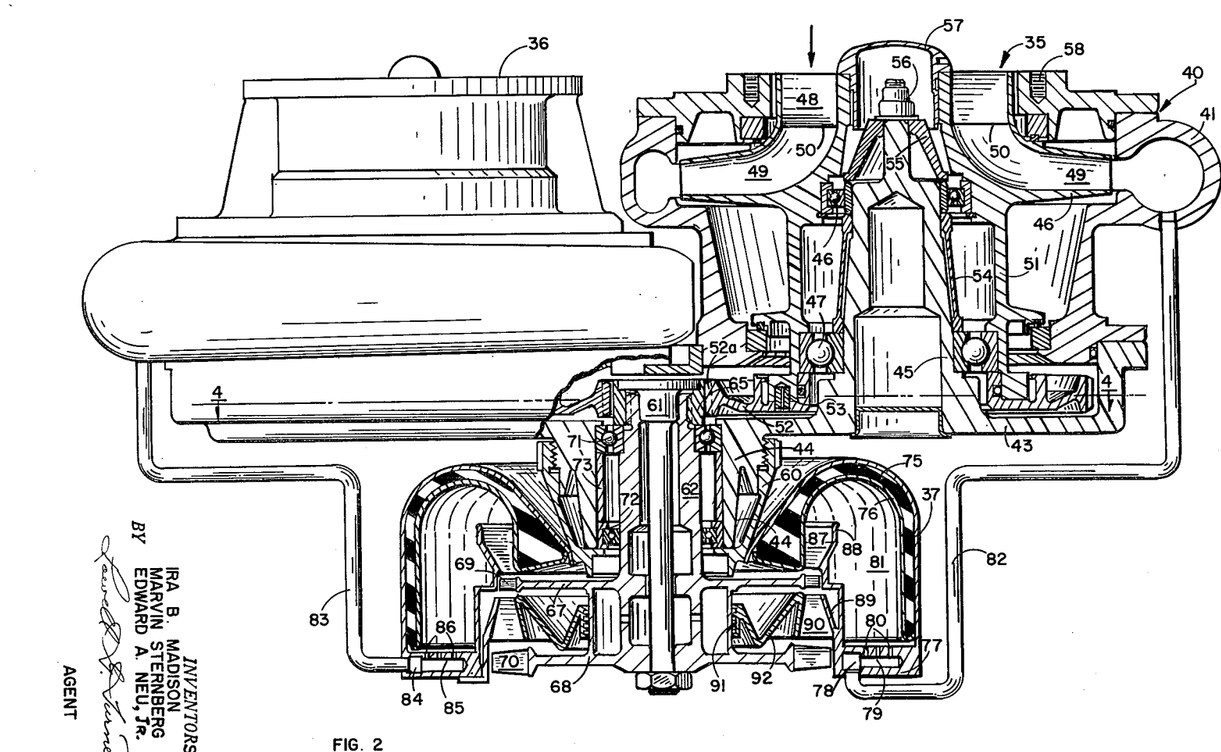
FIG. 2 is a partial cutaway cross section of a turbopump assembly, the section being taken along line 2—2 of FIG. 1.

As seen in FIG. 2, fuel pump 35 includes an upper housing portion 40 having a volute 41 of constantly increasing internal diameter (FIG. 1) as the volute exit 42 is approached. A lower housing portion 43 includes a cylindrical portion 44 which may be common to both the lower housings of the fuel and oxidizer pumps and a stationary central shaft member 45 extending axially and partially through upper pump housing 40. The rotatable portion of the pump is mounted for rotation upon a pair of bearings 46 and 47 coaxially surrounding shaft 45. The rotatable portion includes an optionally includable inducer 48 and an impeller 49 which are preferably integral, as illustrated, but which may be separated into separately movable rotatable elements. Inducer 48 includes a series of essentially radially extending curved vane elements 50 which receive fuel entering the pump and imparting to it an initial velocity. After leaving the inducer, the fuel is directed into the impeller 49 where it is turned approximately 90 degrees to a radially outward direction, increased in velocity and pressure and discharged centrifugally into volute 41. The rotatable portion also includes an extension 51 extending essentially axially from impeller 49 into connection with a spur gear element 52 through which rotational force is imparted to the pump for the ultimate pumping of the propellant. Spur gear 52 is retained upon extension 51 by mechanical attachments as indicated at 53 or by otherwise welding or attaching it thereto in a conventional manner.

Retainers 54 and 55 and nut 56 are provided for maintaining the positions of bearings 46 and 47 and for retaining the rotatable elements in their axial position with relation to the other pump units. A cap member 57 is provided to prevent the fuel from traversing the cavity between the rotatable elements and the central shaft. Threaded bolt holes 58, or similar conventional means, are provided for adapting an inlet conduit (not shown) to upper pump housing 40.

Turbine and gas generator housing 37 is positioned approximately coaxially with the thrust chamber and rearwardly removed in an adjacently spaced but connected relationship from the pumps. Housing 37 is affixed to lower pump housing 43 by a retainer 60 which may be welded or bolted to the housing at the position illustrated. A rotatable shaft 61 is positioned centrally of the turbine and the gas generator assembly and is surrounded by a rotatable shaft 62 having a series of gear teeth 63 upon its forward end, engaged with a series of gear teeth 64 upon a gear ring 65 (see FIG. 4). Gear ring 65 also includes teeth 66 engaging teeth 52a of pump spur gear 52 and in a similar engagement with the teeth of a spur gear 52b which is a counterpart of spur gear 52, but positioned within the oxidizer pump. At the rearward extremity of shaft 62 and attached thereto are a pair of parallel-spaced turbine wheels 67 and 68 having turbine blades 69 and 70, respectively, radially disposed upon the wheel outer peripheries. Shaft 62 is rotatably supported by a pair of bearings 71 and 72, separated in turn by sleeve 73.

The gas generator portion of this device is generally enclosed within housing 37. An insulation filler 75, which may be one of a large number of standard commercially available materials or the material described with respect to liner 30, and a high temperature resistant liner 76, such as ceramic or metal, are disposed over a portion of the inner surface of housing 37. At the rearward extremity of housing 37 an injector 77, having characteristics similar to those of thrust chamber injector 16, includes a manifold 78 interconnected with a series of doghouses 79. Each doghouse 79 has a series of injector orifices 80 leading into a combustion chamber 81; manifold 78 being also interconnected by external line 82 to volute 41 for bleeding fuel from the volute into appropriate injector passages for ultimate injection into the combustion chamber. An external line 83 is provided to bleed oxidizer from the oxidizer volute into an injector manifold 84 and thereafter into doghouses 85 disposed alternately with doghouses 79 about the interior of injector 77. Injector orifices 86 lead from doghouses 85 into combustion chamber 81 where the fuel and oxidizer propellent components are mixed and combusted.

Combustion chamber 81 is of annular or toroidal shape and may incorporate a reverse flow principle illustrated, combustion gases being turned radially inward between liner 76 and an extension 88 and reversed in their direction of flow into an ultimate direction essentially opposite that of initial gas flow. A series of vanes 87 disposed between liner 76 and extension 88 direct the gases into the proper direction for an impingement upon turbine blades 69. However, prior to such impingement, the gases are first compressed through a constricted opening defined between liner 76 and extension 88. Turbine blades 69 are of approximately the same length as the width of such opening and the blades are canted to most efficiently extract the available power from the impinging gases and impart that power as a rotary motion to shaft 62 for driving the pumps. The impingement of the combustion gases upon blade 69 causes expansion of the gases. Maximum advantage is taken of this expansion by next passing the expanded gases through an annular expansion nozzle 89. Nozzle 89 contains a series of vanes 90 which redirect the expanding gases into the desired direction for next passing those gases into impingement with the second stage set of turbine blades 70, thus further extracting the available power from the combustion gases. A labyrinth seal 91, connected by a web 92 to annular nozzle 89, prevents bypassing of excessive amounts of combustion gases around nozzle 89.

Although the specific means for igniting the propellents introduced into combustion chamber 81 is not illustrated, it is to be understood that such ignition may be accomplished either by the hypergolicity of the injected propellents, or by conventional means such as a pyrotechnic igniter or a spark plug. A conventional solid propellant gas generator (not shown) affixed to the structure of combustion chamber 81 in a convenient manner whereby its combustion products are directed into combustion chamber 81 has been found to be a highly acceptable ignition means.

Operationally, it is first necessary to initiate turbine rotation. This may be conveniently accomplished by utilizing the gases evolved by the standard pyrotechnic charge described above for ignition purposes. A pressure is thereby built up within combustion chamber 81 by the combustion products and a portion of the gases are passed from combustion chamber 81 through vanes 87 and 90 and impinged against turbine blades 69 and 70, imparting a rotational force to turbine wheels 67 and 68. This force is transferred to shaft 62 which is engaged with teeth 64 of gear ring 65. The resulting rotation of ring 65 turns spur gear 52 through the engagement of gear teeth 66 and gear teeth 52a. Gear 52, connected to extension 51 which is attached to inducer 48 and impeller 49, causes those elements to rotate about their common axis.

Propellent introduced into the inducer region of the pump is given an initial velocity by vanes 50 and pumped centrifugally by impeller 49. It is then picked up within volute 41, transferred therefrom through exit 42 into manifold 25, and introduced from manifold 25 into certain of the tubes making up inner wall 13. It is passed through these tubes and into the tubes of skirt 23, and, thence, into manifold 26 where it is redirected through alternate skirt and inner chamber wall tubes. Upon its exit from the alternate tubes of wall 13, it is introduced into manifold 27, passed through crossover tubes 28 and certain of the tubes making up outer wall 14. The propellent enters tip or manifold 15 and is redirected through alternate tubes for exit into passages 18 and introduction through orifices 19 into combustion chamber 31.

Oxidizer pump 36 is also driven by ring gear 65, the pump operation being essentially the same as that described with reference to pump 35, but for the ultimate pumping of oxidizer through volute exit 42a (FIG. 1) and for introducing the oxidizer into manifold 17. This propellent is then passed from manifold 17 through orifices 20 and impinged against the fuel within combustion chamber 31.

A portion of each of the propellents is bled from the pump volutes (FIG. 2) through external lines 82 and 83. The propellent passing through line 82 is introduced into manifold 78 within the injector portion of the gas generator. It is then passed into drilled passages or doghouses 79 and injected through orifices 80 into combustion chamber 81. The propellent passing through line 83 enters injector manifold 84, is passed into drilled passages of doghouses 85 and injected through orifices 86 into combustion chamber 81 for impingement against the propellent entering from orifices 80. These mixed propellents are ignited by the standard ignition means described above or by the pressurizing charge introduced for initiating turbine spinning. Combustion products evolved are utilized for bootstrapping and continuing turbine rotation.

Bootstrapping is the continuous increasing of pressures within the combustion chamber which results in increased gas velocities for impingement against the turbine blades. This results in increased rotational speeds of the rotatable components, causing an increased propellent pumping pressure and a greater volume of propellents are thus pumped into the combustion chamber. This sequence continues until the ultimate design speeds and pressures are attained.

Propellents introduced into combustion chamber 31 are ignited by any of the above or other conventional ignition means. They are compressed and passed through throat T (FIG. 3), expanded around tip 15, further expanded within nozzle wall 21 and redirected by the nozzle wall into the ultimate designed exhaust direction.

Structural support between the pumps and the thrust chamber for maintaining their relative positions may be provided by any convenient and conventional means. Such support has been illustrated representatively in FIGS. 1 and 3 by upper support arms 93 and lower support arms 94.

While means for attaching the thrust chamber and/or turbopump to a vehicle structure has not been illustrated, it is obvious that many commonly known structural components such as attachment pads or strut variations may be adapted for this purpose.

FIG. 5 illustrates a turbopump and thrust chamber assembly wherein the turbopump is integrated into the thrust chamber structure in such a manner as to provide great simplification of the overall structure in compact assembly. Therein a combustion chamber 100 in the general shape of a toroid is enclosed similarly to the combustion chamber of FIG. 3 by a series of tubes assembled in approximately the same manner as described with reference to FIG. 3. Outer combustion chamber wall 101 includes a shoulder or tip at its extremity for the expansion of combustion gases therearound and is usable as a manifold for the redirection to alternate tubes of coolant. Inner wall 103 is also constructed from a series of adjacently positioned tubular members continuous with the tubes making up the wall of expansion nozzle 104, a manifold 104a being provided at the nozzle rearward extremity for the redirection of fluid into the return tubes. An annular throat $T_1$ is defined between tip 102 and the wall of nozzle 104. In this instance, it will be noted that the curvature of nozzle 104 begins immediately exteriorly of a flat portion 105 thereof. Thus, throat $T_1$ is formed at a position relative to the curvature of wall 104 so as to provide a slightly rearward component of direction to the throat annulus. It is to be understood that the specific direction of the throat may be varied from an exact radial direction to either a slightly rearward or slightly forward direction prior to the subsequent redirection of the combustion gases by the nozzle wall into a more nearly axially rearward direction. The specific original throat direction is dependent upon design considerations for the particular application to which the thrust chamber is to be adapted.

Intermediate of inner combustion chamber wall 103 is positioned a cyclindrical shaft housing 106. Adapted to the forward extremity of housing 106 is a pump housing 107. Similarly adapted to the rearward extremity of shaft housing 106 is a second pump housing 108. Pump housing 107 includes a propellent inlet 109 and a circumferential propellent receiving volute 110. Volute 110 includes passage means 111 through its rearward side interconnected with the interior of tubular nozzle wall 104, the tubular walls thus providing the entire transmission means whereby propellent is directed from volute 110 to the injector area described below. Pump housing 107 also includes a second propellent inlet 112.

Pump housing 108 includes a volute 113 for receiving pumped propellent and supplying it under pressure to a series of drilled passages or doghouses 114 within an injector indicated as 115 which may form a portion of pump housing 108, as shown, or be manufactured independently thereof. Leading from doghouses 114 into combustion chamber 100 are a series of injector orifices 116 within inserts or extension members 116a. A series of radial passages 118 through injector 115 interconnect the tubes of inner wall 103 with alternate tubes of outer wall 101. Radial passages 118 are alternately spaced with a series of similar radial passages 119 interconnected with and adapted to receive propellent from alternate tubes of outer wall 101. Orifices 120 communicating between radial passages 119 and injector face 117 are provided for injecting propellent into combustion chamber 100.

A series of nozzles 125 are retained in housing 108, the interior of such nozzles interconnecting combustion chamber 101 with a region rearwardly thereof for a purpose described below.

A hollow shaft 126 is mounted coaxially within shaft housing 106 and pump housings 107 and 108 for rotation upon bearings 127 and 128. At the rearward end of shaft 126 and preferably integral therewith is a propellent impeller 129 opening into volute 113 for directing propellent into the volute after its traversal of inlet 112, shaft 126 and impeller 129. Inducer blades 130 may optionally be provided for imparting initial velocity to propellent flowing through shaft 126.

Coaxially attached to the rearward end of shaft 126 and also preferably integral therewith is an extension 131. Attached to and rotatable with extension 131 is a turbine wheel 132 having turbine blades 133 upon its outer periphery. Blades 133 are positioned to accept gas flow from nozzles 125 whereby a rotational force may be imparted to the turbine wheel and, in turn, to extension 131 and shaft 126.

Splined or otherwise attached coaxially about shaft 126 and disposed within housing 107 is a propellent impeller 134, the interior of which communicates between inlet 109 and volute 110 for supplying propellent under a velocity head to volute 110. Inducer blades 135 may optionally be included as a portion of impeller 134 for imparting initial velocity to the propellent.

In a sequence of operation of the FIG. 5 configuration, the pressure within combustion chamber 100 is raised in the manner described above with reference to combustion chamber 81. The resulting pressurized gases are discharged through nozzle 125 and impinged against turbine blades 133, causing turbine wheel 132 to rotate about its axis. Turbine wheel 132 being integrally or mechanically attached to rotatable shaft 126 and to impellers 129 and 134 causes the rotation of all said elements. Once this rotation is initiated, a propellent is introduced through inlet 109 into housing 107 where it is picked up by inducer blades 135, when such elements are included, and introduced into impeller 134. The impeller rotational velocity imparts a velocity head to the propellent and directs it into volute 110. From volute 110, the propellent is passed through orifices 111 and into certain of the tubes in nozzle wall 104. After traversing these tubes, the propellent enters manifold 105 and is redirected through alternate tubes within nozzle wall 104 and passed into the tubes of combustion chamber inner wall 106, then through injector passages 118. It is next directed into certain of the tubes of outer wall 101, into manifold 102 and redirected through alternate tubes in wall 101. It then enters a series of alternate passages or doghouses 119 and is injected into combustion chamber 100 through orifices 120.

Substantially simultaneously with the introduction of the fuel a second propellent, oxidizer, is introduced from a separate propellent tank (not shown) into inlet 112 and directed through shaft 126 where it is picked up by inducer blades 130, when such blades are provided, and moved into impeller 129. From this position, it is pumped radially into volute 113. From volute 113, the propellent enters passages 114 within the injector, traverses orifices 116 and enters combustion chamber 100 where it is impinged against the simultaneously injected fuel and combusted.

Again, ignition of the propellents may be accomplished by the hypergolicity of the injected propellants, by conventional igniter means (not shown) supplied for this purpose or by the combustion chamber pressurizing charge, when used.

Combustion gases evolved in chamber 100 are compressed for passage through throat $T_1$. They are then expanded around manifold or shoulder 102, further expanded within nozzle 104 and redirected by the nozzle walls into a flow pattern dictated by the nozzle wall shape, such flow pattern being dependent upon the particular design considerations of the independent nozzles as curved to meet the needs of particular applications.

As gas pressure builds up within combustion chamber 100, the combustion products resulting from the combustion of the introduced liquid propellents exit through nozzle 125 initiating bootstrap operation.

It can be readily appreciated that through the application of components essentially as set forth with respect to the FIG. 5 configuration, a short, compact and reliable unit is achieved. Fewer structural and rotational elements are included in the configuration than in comparable prior art engines. Through the manner in which the essentially toroidal combustion chamber surrounds rotatable shaft 126 and is positioned between the two propellent pumps, space is utilized efficiently.

The novel means by which combustion gases are bled from the main combustion chamber for driving the turbine and its associated rotatable elements also provides considerable simplification and weight savings, the latter being true since a separate gas generator and propellent supply is not needed to maintain turbine rotation.

It will be apparent to those having knowledge of the rocket engine art that variations in the structural configurations from the apparatus disclosed herein may be made without departing from the scope of the invention. For example, whether a single stage or a two stage turbine is utilized in either of the disclosed configurations is a matter of design which is within the skill of the art.

Through the utilization of the disclosed invention and in keeping with the stated objects of invention, the application of the present invention results in a rocket engine which is more compact and of shorter length for its rated thrust capacity than any rocket engines heretofore known.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A thrust chamber and pump assembly comprising structure defining an annular combustion chamber, means intermediate of said structure providing an opening therethrough, an exhaust nozzle wall attached to and concentrically and outwardly surrounding said structure in a manner requiring any combustion products issuing from said combustion chamber to be directed outwardly and redirected substantially opposite its initial direction by said nozzle wall, and means, positioned substantially within said intermediate opening for pumping propellent into said combustion chamber.

2. A thrust chamber and turbopump assembly comprising a first wall having an inner portion and an outer portion enclosing an annular combustion chamber with the exception of an annular throat opening, said combustion chamber being essentially a toroidal shape, a continuous nozzle wall attached to said inner portion and extending over said outer portion of said first wall in an adjacent spaced relationship with respect to said outer portion and circumferentially surrounding said combustion chamber, and a turbopump retained at least partially intermediate of said toroidal combustion chamber for the purpose of pumping propellent to said combustion chamber.

3. A thrust chamber and pump assembly comprising a cylindrical inner wall defining an inner chamber, a cylindrical outer wall surrounding and spaced from said inner wall and having a free end, an annular propellent injector connected to said walls at one extremity thereof opposite said free end, a combustion chamber being defined between said walls and said injector, a nozzle wall having a central portion attached to said inner wall and extending in a spaced relationship over said free end of said outer wall so as to cooperatively define an annular throat with said free end, said nozzle wall including a skirt portion fixed to said central portion and surrounding said combustion chamber walls in an outwardly spaced relationship, and means interior of said inner wall for pumping propellent to said injector.

4. In combination, a liquid propellent pump adapted to be turbine driven, a wall annularly disposed about said pump, a combustion chamber being defined within said wall, propellent injector means connected to said wall and interconnected to said propellent pump for accepting pumped propellent, an exhaust nozzle wall spaced from said annular wall in a circumferentially spaced relationship with said annular wall, said annular wall and said nozzle wall cooperatively defining an annular throat directed substantially radially outward from said combustion chamber.

5. In combination, a liquid propellent turbopump, a cylindrical inner wall surrounding said turbopump, a cylindrical outer wall surrounding and spaced from said inner wall, an annular propellent injector connected to said walls therebetween at one extremity of said walls, a combustion chamber being defined between said walls and said injector, passage means interconnecting said turbopump and said injector for the transmittal of propellent to said injector, a nozzle wall having a central portion attached to said inner wall so as to cooperatively define an annular throat with said free end, and a skirt portion of said nozzle wall fixed to said central portion and surrounding said combustion chamber walls in an outwardly spaced relation.

6. A rocket engine assembly comprising an annular combustion chamber structure having inner and outer wall portions, an injector fixed between first adjacent ends of said walls, opposite adjacent ends of said walls being open, an exhaust nozzle wall connected to said inner wall portion and extending therefrom so as to close a major portion of said open end and so as to circumferentially surround said combustion chamber in an outwardly spaced relationship, said nozzle wall being spaced from said outer portion of said combustion chamber structure so as to provide an annular throat, a liquid propellent pump structurally supported intermediate said inner wall portion of said combustion chamber, and propellent conduit means interconnecting said pump and said injector.

7. A rocket engine thrust chamber and turbopump assembly comprising a thrust chamber including structure defining an annular combustion chamber, a nozzle wall attached to said structure for directing combustion gases essentially radially outward from said combustion chamber, said nozzle wall shaped to facilitate redirection of said gases into a more nearly axial direction, an injector fixed to said combustion chamber structure for injection of liquid propellents into said chamber, and a turbopump attached to said thrust chamber, said turbopump being positioned at least partially within an internal circumference of said combustion chamber structure.

8. The rocket engine thrust chamber and turbopump assembly set forth in claim 7, wherein said turbopump includes a turbine and at least one propellent pump, and wherein passage-means is provided communicating from said combustion chamber to said turbine whereby combustion products are passed directly from said combustion chamber to said turbine.

9. The rocket engine thrust chamber and turbopump assembly set forth in claim 7, wherein said turbopump includes a first propellent pump mounted upon said nozzle wall externally thereof and coaxially with said nozzle wall and said combustion chamber, a second propellent pump mounted inwardly from said combustion chamber structure within said nozzle wall, an elongated shaft common to and connecting said pumps for rotating said pumps about a common axis, and a turbine attached to said shaft for driving same in rotation, said turbine adapted to be driven by combustion gases bled from said combustion chamber.

10. The rocket engine thrust chamber and turbopump assembly of claim 9, wherein said shaft is hollow and adapted to have propellent transmitted therethrough, and wherein a propellent impeller is included as an integral portion of said shaft at one extremity thereof, said impeller being a portion of said second pump.

11. A rocket engine thrust chamber and turbopump assembly, said thrust chamber including a divergent nozzle wall, an essentially toroidal combustion chamber structure connected to said nozzle wall, an outer wall of said structure including a free end adjacently spaced from said nozzle wall and defining an annular constricted throat with said wall, said nozzle wall and said combustion chamber structure being constructed of a series of abutted and interconnected tubular elements, said elements providing means for the passage threthrough of a propellent for cooling said walls, an injector connected to said combustion chamber, a pump housing attached to and mounted partially externally of and partially internally of said thrust chamber and including an external pump receiving portion, an internal pump receiving portion, and an internal shaft receiving portion connecting said pump receiving portions, said external portion having first and second propellent inlets, a propellent-collecting volute within said external portion and interconnected to said first propellent inlet, and to said tubular wall elements so as to cause propellent exiting from said volute to be passed through said tubes, a hollow shaft axially extending through said shaft receiving portion and into said pump receiving portions and including a propellent impeller positioned within said internal pump receiving portion at one extremity of said shaft, an opposite extremity of said shaft adapted for receiving propellent from said second inlet, a propellent impeller mounted upon said shaft and within said external pump receiving portion for rotation with said shaft, a turbine wheel attached to said shaft adjacent said first mentioned impeller, said turbine wheel including blades mounted upon its periphery, and means communicating between said combustion chamber and said turbine blades for directing combustion gases from said combustion chamber and into impingment against said blades whereby said turbine causes rotation of said shaft and said impellers and propellents are pumped through said inlets, housings, tubes, and injector and directed into said combustion chamber for combustion therein.

12. A rocket engine pump and thrust chamber assembly comprising a fuel pump, an oxidizer pump mechanically connected to rotate with said fuel pump, a turbine attached to said pumps for driving said pumps in rotation, means for imparting rotation to said turbine, an annular manifold connected to said fuel pump, an annular manifold connected to said oxidizer pump, a propellent injector connected to said manifolds for receiving propellent therefrom, an inner cylindrical wall connected to said injector, an outer cylindrical wall connected to said injector in a spaced relationship concentrically outward from said inner wall, said walls and said injector cooperatively defining a combustion chamber adapted to receive propellents from said injector, and a nozzle wall connected to and extending from said inner wall and over a free end of said outer wall, said nozzle wall and said outer wall free end cooperatively defining an annular throat, said nozzle wall diverging from the region of said throat and surrounding said combustion chamber and said pumps, at least a portion of said pumps being positioned within forward and rearward confines of said nozzle wall.

13. The rocket engine pump and thrust chamber assembly of claim 12, wherein said nozzle wall and said combustion chamber walls are of tubular construction and wherein tubes making up said inner wall and said nozzle wall are continuous and common to said last mentioned walls, wherein said fuel manifold is connected to said inner wall, and wherein passage means are provided for transmitting fuel from said fuel manifold into said tubes for regeneratively cooling said tubes prior to introduction of said fuel to said injector.

14. The rocket engine pump and thrust chamber assembly of claim 12, wherein a compressive structural member is positioned against said inner wall exteriorly of said combustion chamber for supporting said inner wall and a tensile structural member is positioned against the exterior surface of said outer wall for supporting said outer wall, and wherein an insulating material is disposed circumferentially and externally about said tensile structure in contact therewith.

15. In combination, a reverse flow thrust chamber including structure making up a toroidal combustion chamber, a nozzle wall attached to and extending from said structure and surrounding said structure in an outward spaced relationship, said structure and nozzle wall defining an annular throat, a rotatable hollow shaft intermediate of said combustion chamber and coaxial with said combustion chamber and said nozzle, a propellent impeller upon a rearward extremity of said shaft, a housing surrounding said impeller and including a volute for receiving pumped propellent, an injector connected to said housing and to said combustion chamber, passage means in said injector interconnected with said volute, orifice means in said injector communicating between said passages and said combustion chamber, separate passage means in said injector spaced from said first mentioned passage means, a second impeller affixed about said shaft adjacent a forward extremity thereof, a housing surrounding said second impeller and including a first inlet for directing propellent into said hollow shaft, a second inlet for directing propellent through said second impeller, and a second volute for receiving propellent pumped by said second impeller, conduit means communicating between said second volute and said separate passage means in said injector, orifice means in said injector communicating between said separate passage means and said combustion chamber, and means attached to said shaft for driving said shaft and said impellers in rotation.

16. The combination of claim 15, wherein said combustion chamber structure and said nozzle wall are made up of a series of abutted and joined tubular members adapted to be cooled by the passage of propellent therethrough, and wherein said tubes provide said conduit means.

17. The combination of claim 15, wherein said means attached to said shaft for driving said shaft and said impeller in rotation is a turbine having peripheral blades and being attached to a rearward extremity of said shaft, and wherein at least one nozzle is provided through said injector for accepting gases from said combustion chamber and directing those gases against said blades.

References Cited by the Examiner
UNITED STATES PATENTS

| | | | |
|---|---|---|---|
| 1,375,601 | 4/21 | Morize | 60—35.6 |
| 1,668,052 | 5/28 | Davis | 244—23 |
| 1,879,579 | 9/32 | Stolfa et al. | 60—35.6 |
| 2,416,389 | 2/47 | Heppner et al. | 60—35.6 |
| 2,585,626 | 2/52 | Chilton | 60—35.6 |
| 2,711,629 | 6/55 | Schapker | 60—35.6 |
| 2,735,263 | 2/56 | Charshafian | 60—35.6 |
| 2,814,179 | 11/57 | Edelman et al. | 60—35.6 |
| 3,021,669 | 2/62 | Nye | 60—35.6 |
| 3,049,876 | 8/62 | Connors | 60—35.6 |

FOREIGN PATENTS

| | | |
|---|---|---|
| 733,369 | 7/32 | France. |
| 19,347 | 7/04 | Great Britain. |
| 618,886 | 3/49 | Great Britain. |
| 91,453 | 11/21 | Switzerland. |

OTHER REFERENCES

"Plug Nozzle Rockets Show Space, Missile Promise," Aviation Week, Feb. 1, 1960, vol. 72, No. 5.

SAMUEL LEVINE, *Primary Examiner.*

ABRAM BLUM, SAMUEL FEINBERG, *Examiners.*